(12) United States Patent
Liotta et al.

(10) Patent No.: US 6,193,465 B1
(45) Date of Patent: Feb. 27, 2001

(54) TRAPPED INSERT TURBINE AIRFOIL

(75) Inventors: Gary C. Liotta, Beverly; Paul J. Acquaviva, Maldon; James N. Fleck, Boxford, all of MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/161,299

(22) Filed: Sep. 28, 1998

(51) Int. Cl.$^7$ .............................. B63H 3/00; B64H 11/06; B21D 53/78
(52) U.S. Cl. ..................................... 416/96 A; 29/889.722
(58) Field of Search ................ 416/90 R, 96 A, 416/97 R; 29/889.721, 889.722

(56) References Cited

U.S. PATENT DOCUMENTS

| | | | |
|---|---|---|---|
| 2,696,364 | * 12/1954 | Bartlett ................................. | 416/92 |
| 2,923,525 | 2/1960 | Creek . | |
| 3,301,527 | * 1/1967 | Kercher ........................... | 416/96 A X |
| 3,606,572 | * 9/1971 | Schwedland ....................... | 416/90 R |
| 3,628,885 | * 12/1971 | Sidenstick et al. ............ | 416/96 A X |
| 3,656,222 | 4/1972 | Jones . | |
| 3,700,348 | * 10/1972 | Corsmeier et al. ................ | 416/90 R |
| 3,715,170 | * 2/1973 | Savage et al. ..................... | 416/97 R |
| 3,768,147 | * 10/1973 | Berry et al. ..................... | 29/889.7 X |
| 3,806,275 | 4/1974 | Aspinwall ........................... | 416/97 R |
| 3,846,041 | * 11/1974 | Albani ................................ | 416/97 R |
| 3,867,068 | 2/1975 | Corsmeier et al. ................ | 416/97 R |
| 3,891,348 | * 6/1975 | Auxier ................................ | 416/97 R |
| 3,966,357 | * 6/1976 | Corsmeier ........................... | 416/97 R |
| 3,973,874 | * 8/1976 | Corsmeier et al. ................ | 416/97 A |
| 3,994,622 | * 11/1976 | Schultz et al. ...................... | 416/97 R |
| 4,020,538 | 5/1977 | Dennis et al. ................... | 29/156.8 H |
| 4,364,160 | 12/1982 | Eiswerth et al. . | |
| 4,484,859 | 11/1984 | Pask et al. . | |
| 4,542,867 | 9/1985 | Memmen ....................... | 416/90 R X |
| 4,790,721 | * 12/1988 | Morris et al. ..................... | 416/96 A |
| 5,152,059 | 10/1992 | Midgley ....................... | 29/889.721 X |
| 5,176,499 | 1/1993 | Damlis et al. ..................... | 416/97 R |
| 5,203,873 | * 4/1993 | Corsmeier et al. ................ | 416/96 A |
| 5,259,730 | * 11/1993 | Damlis et al. ..................... | 416/96 A |
| 5,392,515 | 2/1995 | Auxier et al. . | |
| 5,429,877 | 7/1995 | Eylon . | |

* cited by examiner

*Primary Examiner*—John E. Ryznic
(74) *Attorney, Agent, or Firm*—Andrew C. Hess; Rodney M. Young

(57) ABSTRACT

A gas turbine engine airfoil is manufactured by forming an internal retention seat in two complementary airfoil parts. An insert is fabricated for retention in the seat. The two parts are assembled with the insert disposed in the seat therebetween. The parts are then bonded together to trap the insert therein to collectively define the airfoil. The insert and seat may be precisely fabricated for improving the efficiency of the airfoil.

21 Claims, 4 Drawing Sheets

TRAPPED INSERT TURBINE AIRFOIL

BACKGROUND OF THE INVENTION

The present invention relates generally to gas turbine engines, and, more specifically, to cooling thereof.

In a typical gas turbine engine, air is pressurized in a multistage axial compressor, mixed with fuel in a combustor and ignited for generating hot combustion gases which flow downstream through several turbine stages which extract energy therefrom. The turbine stages include airfoils in the form of stator vanes which turn and accelerate the combustion gases into rotor blades which extract energy therefrom.

In a typical high pressure turbine, both the vanes and blades are hollow and supplied with a portion of pressurized air from the compressor which is used for cooling the respective airfoils thereof. Various features are provided for maximizing the cooling effectiveness of the compressor air, which in turn maximizes the efficiency of the engine.

Typical airfoil cooling features include serpentine cooling passages for selectively cooling the different portions of the airfoil from its leading edge to its trailing edge. The passages may include various forms of turbulators which enhance forced convection cooling. The cooling air may be discharged from the airfoils from various holes in the pressure or suction sides thereof or along the tip or trailing edge thereof. Air discharged through the airfoil sidewalls passes through inclined film cooling holes which effect a cooling air film over the outside of the airfoil to protect the airfoil against the hot combustion gases.

The airfoils may include discrete impingement baffles which firstly direct the cooling air in impingement against the inner surface of the airfoil for cooling thereof, with the spent air then being discharged from the airfoil through various ones of the discharge holes. Since nozzle vanes are stationary and are mounted between radially outer and inner bands, the impingement baffles may be assembled therein through either band.

In contrast, the turbine rotor blades are fixedly mounted at their radially inner ends by dovetails to the outer perimeter of rotor disk. Impingement inserts therefor may therefore be inserted therein typically only from the radially outer tip end thereof. Since rotor blades typically have varying twist, camber, and taper from root to tip, the ability to assemble impingement baffles therein is correspondingly limited.

Since turbine airfoils are subject to the hot combustion gases, they are typically made of advanced superalloy materials having high temperature, high strength capability for maximizing engine performance. To create the various internal cooling features in these airfoils a casting process is typically used. Casting, however, is limited in its ability to precisely form the internal cooling features, which therefore limits the efficiency thereof. And, the impingement baffles must still be separately manufactured and suitably installed in the individual airfoils.

The baffles must also be secured therein, which is typically accomplished at solely one end thereof for permitting unrestrained differential thermal expansion and contraction movement between the baffle and the airfoil under the varying temperature environment of the engine. Since the rotor blades are subject to considerable centrifugal force during operation, baffles therefor must be adequately secured for withstanding the high G28 forces therefrom.

Accordingly, it is desired to further improve the internal cooling features of a gas turbine engine airfoil such as stator vanes and rotor blades for further increasing cooling effectiveness, along with additional benefits.

BRIEF SUMMARY OF THE INVENTION

A gas turbine engine airfoil is manufactured by forming an internal retention seat in two complementary airfoil parts. An insert is fabricated for retention in the seat. The two parts are assembled with the insert disposed in the seat therebetween. The parts are then bonded together to trap the insert therein to collectively define the airfoil. The insert and seat may be precisely fabricated for improving the efficiency of the airfoil.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
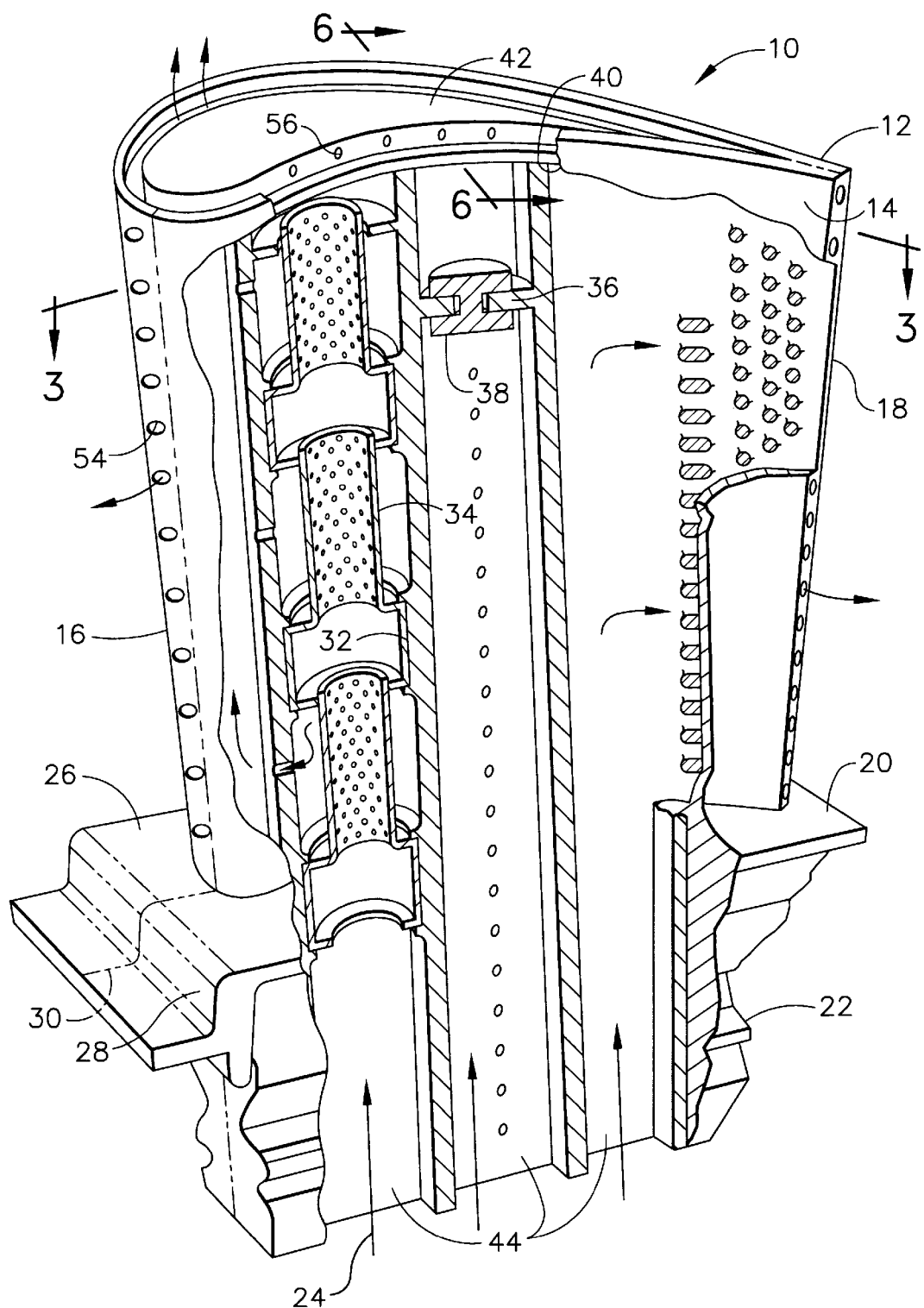
FIG. 1 is an isometric, partly cut-away view of a gas turbine engine airfoil in accordance with an exemplary embodiment of the present invention.

Illustrated in FIG. 1 is a gas turbine engine airfoil 10 in the exemplary form of turbine rotor blade. The airfoil is hollow and includes a generally convex suction side 12, and generally concave pressure side 14 joined together along axially spaced apart leading and trailing edges 16,18, and extending radially from a root to tip over which hot combustion gases are flowable during operation.

The airfoil also includes a blade platform 20 which defines the radially inner flowpath boundary for the combustion gases, and an integral dovetail 22 extends therebelow for mounting the blade to the perimeter of a rotor disk (not shown) in a conventional manner.

In an alternate embodiment, the airfoil may be configured as a turbine stator vane extending radially between outer and inner bands which define corresponding flowpath boundaries for the combustion gas. In both embodiments, the airfoil is hollow for channeling therethrough cooling air 24 bled from a compressor of the engine (not shown). But for the method of manufacturing the airfoil in either blade or vane form, and the corresponding improvements in internal features thereof, the airfoil may otherwise be conventional in configuration and function for use in a gas turbine engine.

The present invention improves the ability to manufacture internal airfoil cooling features therein for improving cooling efficiency, strength, and other benefits which may also be provided in any other hollow turbine component to advantage.

Improvements to the internal features of the airfoil 10 are possible in accordance with the present invention by initially making the airfoil in two complementary airfoil halves or parts 26,28 having respective mating surfaces 30 (shown in phantom) which are suitably bonded together to form an integral bond joint. The initial parts 26,28 are discrete members which may be initially separately manufactured with precision internal features not possible when a unitary airfoil is cast in a conventional manner. The internal features of the airfoil may include all various forms of internal cooling features and partitions of the airfoil, including in particular one or more internal retention seats formed in corresponding portions of the airfoil sides for supporting corresponding inserts which would not be physically possible in a unitary, cast airfoil in conventional practice.

For example, a first type of seat 32 is specifically configured for retaining a first type of insert in the form of an impingement baffle 34. A second type of retention seat 36 is specifically configured for retaining a corresponding second type of insert in the form of a damper 38. And, a third type of retention seat 40 is specifically configured for retaining a corresponding third type of insert in the form of tip cap 42.

Figure 2:
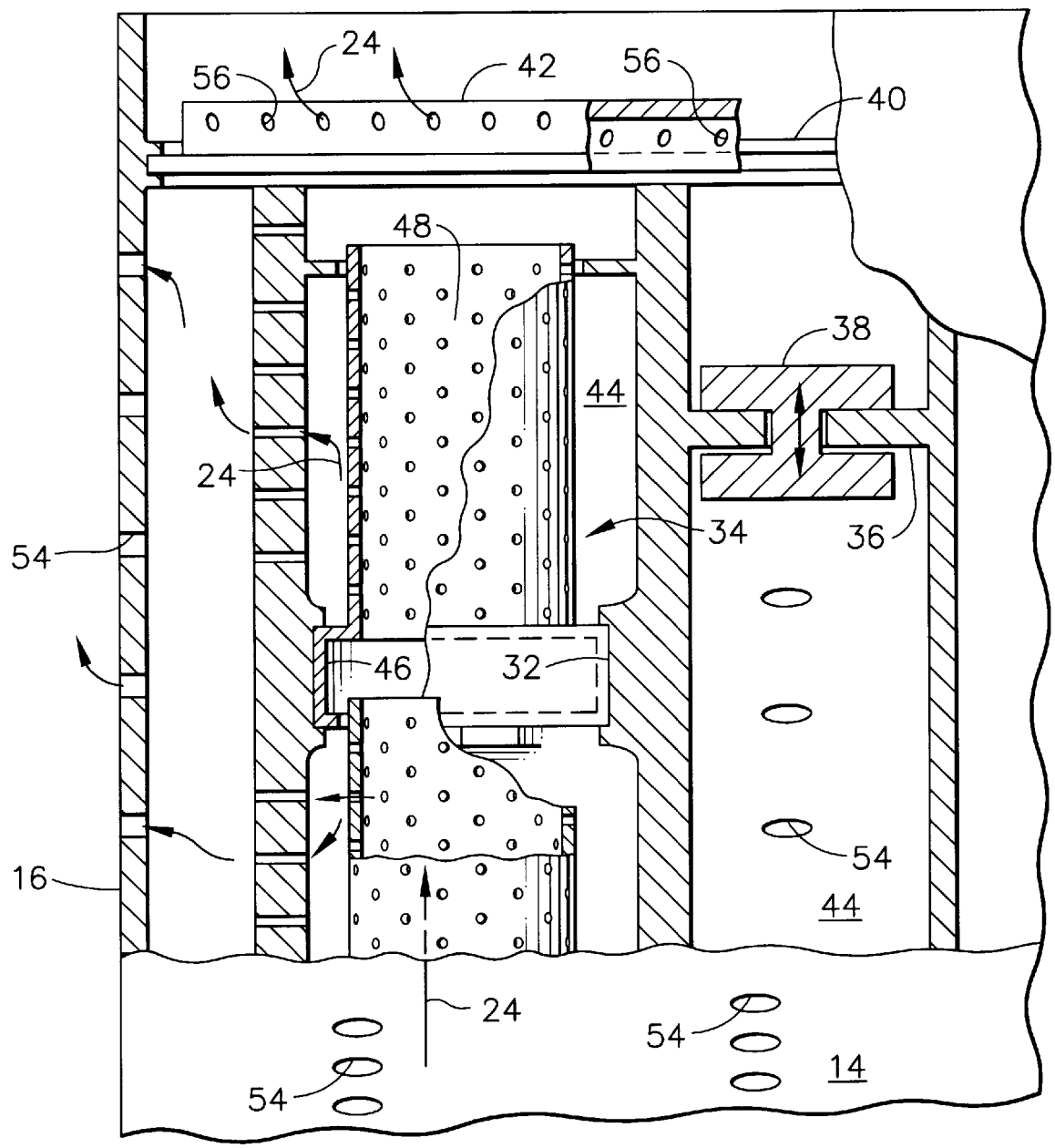
FIG. 2 is an enlarged, partly sectional axial view of a tip portion of the airfoil illustrated in FIG. 1 having an impingement baffle, vibration damper, and tip cap in accordance with preferred embodiments of the present invention.
Figure 3:
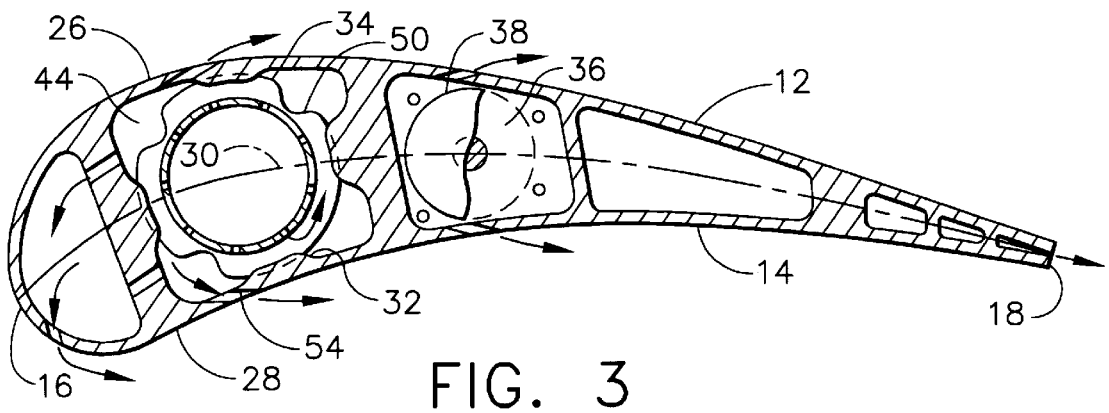
FIG. 3 is a radial sectional view through the airfoil illustrated in FIG. 1 and taken along line 3—3.
Figure 4:
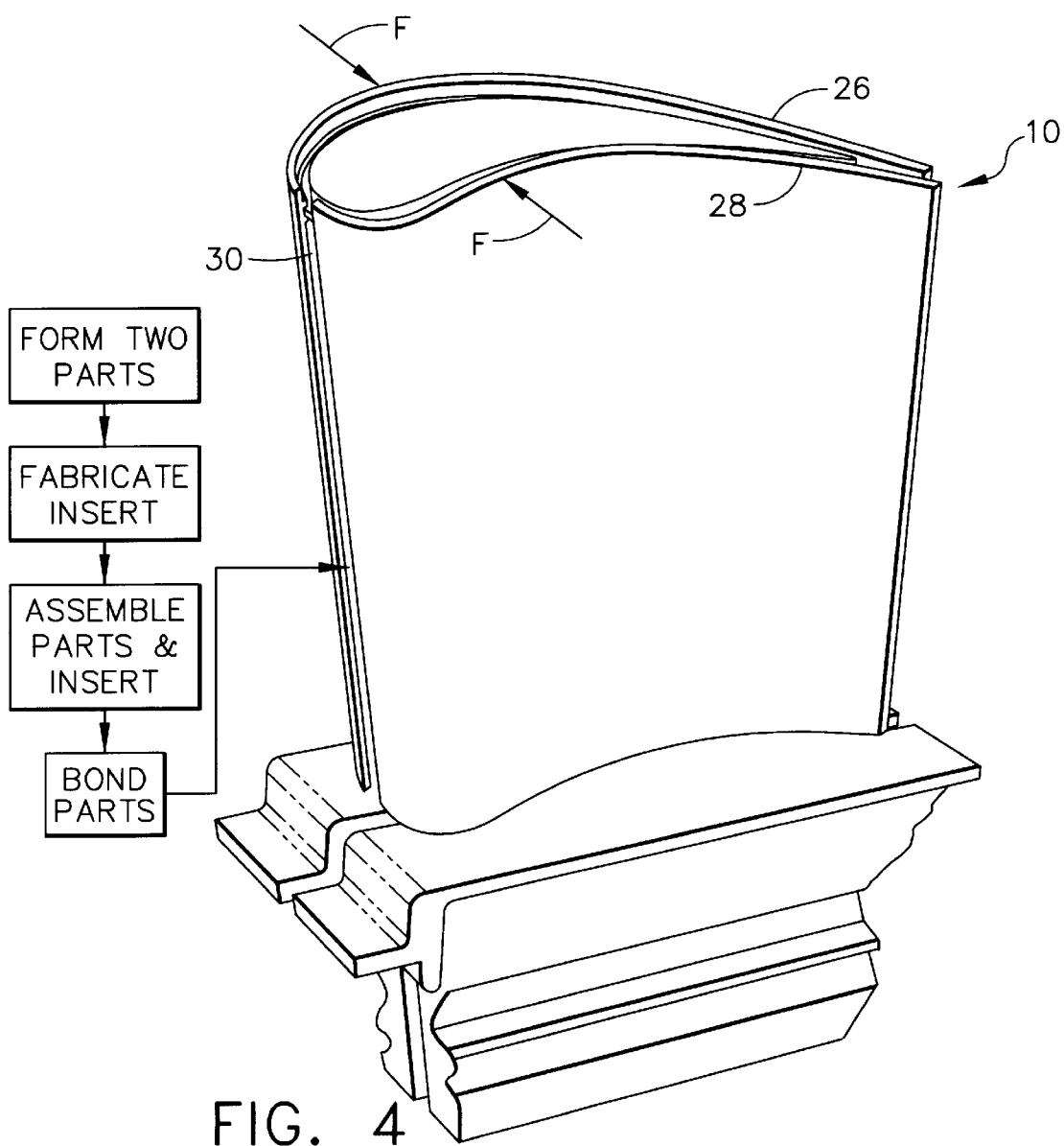
FIG. 4 is a schematic representation of a method of manufacturing the airfoil illustrated in FIGS. 1–3 in accordance with an exemplary embodiment of the present invention.

The three types of internal retention seats 32,36,38 and the corresponding inserts 34,38,42 retained therein are illustrated in more detail in FIGS. 2 and 3, and a flowchart representation of an improved method of making a bifurcated airfoil is illustrated in FIG. 4. By initially forming the airfoil in the two parts 26,28, direct access to the insides thereof permits all the internal features thereof to be precisely formed by casting and subsequent machining for example. The various inserts are also separately fabricated in any suitable manner for also enjoying precise tolerances. And, the specific configurations of the various inserts may be selected without concern for assembly since the two parts are readily assembled together with the corresponding inserts therebetween in their respective seats. The specific configuration of the inserts and their retention seats is no longer limited by the requirement to insert the inserts through an open radially outer or inner end of the airfoil in accordance with conventional practice.

The airfoil parts 26,28, and corresponding inserts, may be readily assembled together at the mating surfaces 30 for being suitably bonded together such as by diffusion bonding. Diffusion bonding is a conventional process in the form of solid state brazing or welding which integrally joins together the two parts at the mating surfaces 30 resulting in a unitary airfoil when complete having suitable high temperature and high strength capability for use in gas turbine engines. The specifically configured internal retention seats physically trap the corresponding inserts therein, and, if desired, one or more of the inserts may additionally be diffusion bonded in their respective seats as desired.

Referring again to FIG. 1, one or more radial passages or channels 44 are formed in the corresponding airfoil parts for channeling the cooling air 24 therethrough when assembled together in the finished airfoil. The various retention seats are preferably formed to bridge the passage in the axial or chordal direction. The corresponding inserts may then be assembled in their respective seats inside the passages for being trapped therein upon assembly of the two airfoil parts together.

As shown in more detail in FIG. 2, the respective seats 32,36,40 are specifically configured to complement the respective inserts 34,38,42 and physically or mechanically trap the inserts radially in the assembled airfoil.

Furthermore, the respective passages 44 are sized radially longer than the corresponding inserts, and the inserts are sized radially longer than their respective seats. In this way, the inserts are trapped in their respective seats and are unrestrained in the passages to thermally expand and contract radially from their seats for accommodating differential thermal expansion and contraction between the inserts and the airfoil itself during operation. Differential thermal expansion and contraction is a significant concern in gas turbine engines which must be suitably accommodated for reducing thermal stress and enjoying a suitable useful life. Furthermore, for the airfoil 10 in the exemplary form of a rotor blade, centrifugal forces generated during rotation of the blade during operation create substantial loads and corresponding stresses in the blade components which require suitable retention of the respective inserts without unacceptably large stress which would limit blade life.

For example, impingement baffles are quite effective in cooling the inside of turbine vanes or blades. In a blade, however, their efficiency is limited by their configuration and retention in the blade due in most part to the restrictions in assembling the baffle inside the blade and securing it therein. A conventional baffle is typically a one piece component secured at its radially inner end in the blade for allowing unrestrained differential thermal expansion and contraction with the airfoil, and for carrying the centrifugal loads to the root of the airfoil.

Since the airfoil is manufactured in the two parts 26,28, the impingement baffle 34 may have an improved configuration including a hollow retention hub 46 shown in FIG. 2 configured for being trapped in the corresponding first seat 32 and receives the cooling air 24 therethrough. The baffle also includes an integral, perforate tube 48 extending radially or longitudinally from its hub 42 for distributing the cooling air in impingement against the inside surface of the two airfoil parts 26,28.

The baffle hub 46 is larger in diameter than the baffle tube 48 to trap the hub in its seat 32, and space the tube away from the inner surface of the airfoil parts for impingement cooling thereof. The hub 46 may be cylindrical in configuration, with the first seat 32 being in the form of a complementary annular slot or groove defined between a pair of radially spaced apart flanges to trap the hub 46 in all directions. As shown in FIG. 3, the flanges of the first seat 32 may be locally formed inside both airfoil parts 26,28 and in the partitions defining the radial passage 44 over a sufficient circumferential extent for trapping the hub 46.

The hub 46 may be imperforate, at least where it is trapped in the seat flanges, or could otherwise be perforate for effecting impingement cooling at corresponding locations of the airfoil. As shown in FIG. 3, the hub 46 may be interrupted around its perimeter by one or more radial indentations or slots 50 which increase the flexibility of the hub 46 around its circumference for accommodating differential thermal expansion and contraction around the hub within its seat.

Since the baffle hub 46 provides a substantial retention feature, the baffle itself may be made extremely thin, down to about 0.127 mm for example, which is substantially thinner than a conventional impingement baffle. The reduced thickness correspondingly reduces centrifugal loads in the rotor blade configuration, and therefore reduces centrifugal stress in the blade. The impingement baffle may also now be formed of a soft material like a nickel alloy. A nickel alloy impingement baffle may be precision manufactured using conventional electroforming.

In the preferred embodiment illustrated in FIGS. 1 and 2, a plurality of the first seats 32 are formed in the two parts and are radially spaced apart from each other. A plurality of the impingement baffles 34 are separately fabricated and assembled into corresponding ones of the seats 32 in radial alignment together.

In one embodiment, the individual baffles 34 may be discrete members, and are nested together for unrestrained differential radial thermal movement therebetween. The individual baffles 34 are suitably stacked end-to-end in flow communication in the corresponding precision machined radial passage 44, with each baffle being separately retained in its respective seat 32. In this way, the centrifugal loads from each of the baffles is separately carried by the corresponding hubs 46 into the corresponding seats 32 for distributing the centrifugal loads and reducing load concentration. Furthermore, each baffle is unrestrained to freely expand and contract radially from its corresponding hub 46 which decouples such thermal movement in the baffles. Since each baffle is relatively short, the relative radial thermal expansion and contraction thereof is correspondingly reduced.

Each baffle may be simply mechanically trapped in its corresponding seat 32 around the hub 46, or the hub may be bonded in the seat 32 during the bonding process or otherwise welded or brazed therein as desired. Since the hub 46 is formed of thin metal and has a larger diameter than the corresponding tube 48, the hub acts like a portion of a flexible bellows which additionally accommodates any differential thermal expansion and contraction between the hub 46 and its seat 32.

Figure 5:
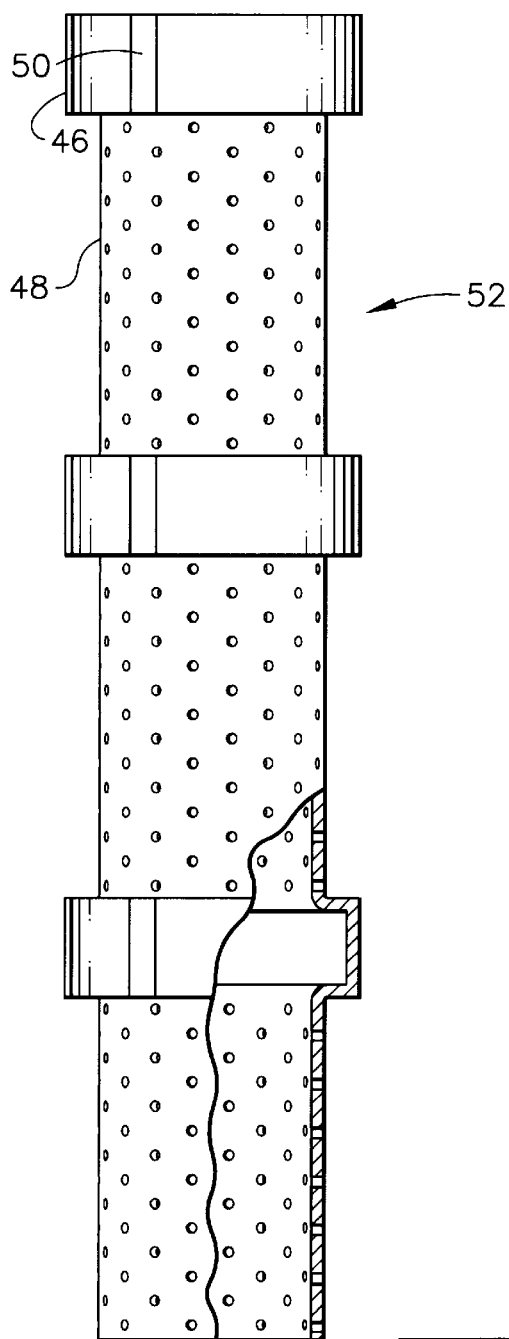
FIG. 5 is an elevational, partly sectional view of an impingement baffle for the airfoil of FIG. 1 in accordance with another embodiment of the present invention.

FIG. 5 illustrates an alternate form of the impingement baffle, designated 52, wherein a plurality of the individual impingement baffles are integrally formed together in a unitary member defining a bellows for elastically accommodating differential thermal movement between the corresponding hubs 46 thereof. The one-piece baffle 52 may also be formed of relatively thin metal for reducing centrifugal loads therefrom, and improving the radial flexibility of the bellows. The one-piece baffle is preferred over the multiple segment baffle disclosed above for maintaining flow channeling continuity from hub to hub.

The bellows is trapped in the airfoil at respective ones of the hubs 46, and differential thermal expansion and contraction between the hubs is accommodated by elastic deflection thereof. The multiple hubs 46 distribute the centrifugal loads into the airfoil seats 32 and securely trap the baffle over its entire length in the airfoil instead of at simply one location thereof. In this embodiment, the radial slots 50 in the several hubs 46 may be aligned together for also increasing the axial or longitudinal flexibility of the unitary impingement baffle 52.

The cooling air 24 channeled through the impingement baffle as illustrated in FIG. 2 is discharged from the baffle through the apertures in the tube 48 in impingement against the internal surfaces of the pressure and suction sides of the airfoil, as well as the internal surfaces of the radial partitions therein. The spent impingement air may then be discharged from the airfoil through various discharge holes such as conventional film cooling holes 54 disposed in flow communication therewith in a conventional manner.

As indicated above, the ability to form the airfoil initially in two parts allows the ability to precision machine the various internal features therein such as the radial cooling air passages 44 and the corresponding baffle seats 32 therein. The baffles 34,52 may be separately precision manufactured and then assembled into their respective seats 32 for being trapped between the two parts when they are bonded together to form the resulting, unitary airfoil 10. In this way, the impingement baffle may be otherwise optimized in configuration as desired for individual vane or blade applications formed in two parts in accordance with the present invention. Both the cooling effectiveness of the impingement baffle may be optimized, and its strength under centrifugal and thermal loads in the airfoil may be maximized.

Corresponding improvements in blade damping may also be effected in accordance with the improved method of manufacture of the present invention. Typical blade dampers are located at the root or platform of the blade and have limited effectiveness since vibratory displacement typically increases toward the tip of the blade. As initially shown in FIG. 1, the insert in the form of the damper 38 may be loosely trapped in its seat 36 near the radially outer end of the airfoil for permitting limited vibratory movement therebetween for frictional or coulomb damping vibration of the airfoil during operation.

The damper 38 may take various configurations, and in the exemplary embodiment illustrated in more detail in FIGS. 2 and 3, the damper 38 is in the form of two radially spaced apart disks integrally joined together by a center shaft. The corresponding damper seat 36 is in the form of an axially or chordally extending flat plate integrally bridging adjacent radial partitions and the suction and pressure sidewalls of the airfoil. A hole is formed through the damper seat 36 for receiving the center shaft of the damper, with the two disks of the damper radially straddling the seat. In this way, the damper 38 is effectively trapped and loosely attached to the seat 36 and may itself locally vibrate relative to the seat to effect friction damping of the airfoil.

This type of airfoil damper may have the ability to dampen airfoil vibratory stripe modes. Current stripe modes are not effectively dampened by conventional platform dampers which require other modifications in blade design for avoiding vibratory stripe modes. Avoiding the vibratory stripe modes also restricts the aerodynamic design of the blade itself. By introducing an effective airfoil damper to dampen the vibratory stripe modes, additional flexibility in aerodynamic design of the blade may be used to advantage.

In a typical turbine blade, it is desirable to locally cool the radially outer tip region thereof. Impingement cooling requires an aperture aligned with a corresponding portion of the blade tip for impinging thereagainst the cooling air provided from inside the airfoil. However, the ability to optimize impingement cooling of blade tips is limited by the ability to form or drill inclined holes near the tip without locally damaging the tip itself.

The improved manufacturing method of the present invention allows improvements to blade tip cooling by introducing the separately manufactured tip cap 42, initially illustrated in FIG. 1, which is trapped at the radially outer tip end of the airfoil, and includes inclined holes 56 formed or drilled therein for impingement cooling respective ones of the two airfoil parts 26,28 at the outer ends thereof. As shown more clearly in FIGS. 2 and 6, the tip cap 42 is suitably recessed radially inwardly below the radially outer ends of the suction and pressure sides 12,14 which effectively hides the inclined tip holes 56 therebelow for locally impingement cooling the inner surfaces of the airfoil sides at the tips thereof.

Figure 6:
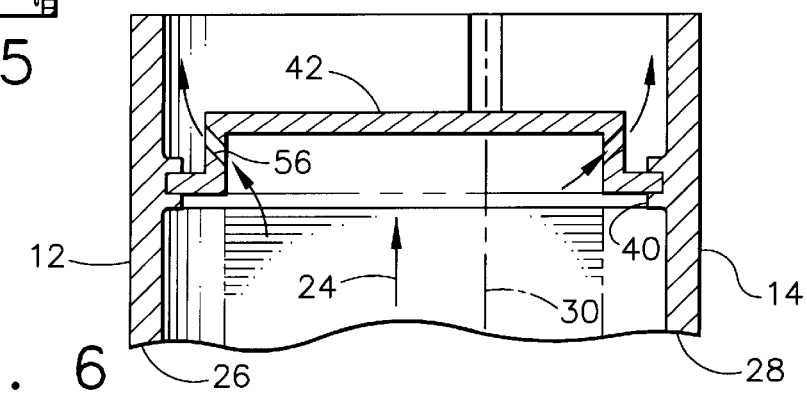
FIG. 6 is an enlarged, transverse sectional view through the airfoil tip illustrated in FIG. 1 and taken along line 6—6.

As shown in FIG. 6, it is impossible to drill the inclined, hidden tip holes 56 in the tip cap when it is installed in the airfoil. However, since the tip cap 42 may be separately manufactured, the inclined tip holes 56 are readily formed therein without damaging the airfoil. The tip cap 42 may therefore have any suitable configuration optimized for cooling the airfoil tip with various inaccessible tip cooling holes being formed therein, not otherwise possible. The tip cap 42 may then be assembled between the two airfoil parts 26,28 for being trapped therein upon bonding.

The tip seat 40 may have any suitable configuration such as a pair of radially spaced apart ridges formed in the inner surfaces of the airfoil parts having a groove therebetween which receives a corresponding end flanges of the tip cap 42 which is trapped therein. This tongue-in-groove retention configuration mechanically supports the tip cap 42 in the airfoil for reacting the centrifugal loads therefrom during operation. If desired, the tip cap 42 may be bonded to the seat 40 during the diffusion bonding process or separately brazed or welded as desired.

The various inserts described above illustrate examples of precision machined components varying in degree of complexity which may now be introduced in gas turbine engine airfoils such as stator vanes and rotor blades. The corresponding retention seats for these inserts may be precision machined in the separate airfoil parts prior to assembly which results in a substantially improved turbine airfoil. The various inserts may be used individually or collectively for improving impingement cooling of the airfoil either inside along the radial passages thereof or at its tip. And vibratory damping may also be improved. In an alternate embodiment, the impingement baffles themselves may be loosely trapped in their respective seats for additionally providing vibratory damping without the need for a separate damper 38. And, since the various inserts are primarily mechanically trapped in their respective seats, they may now be formed of any suitable material other than that of the parent material of the airfoil itself for providing additional advantages.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A method of making a gas turbine engine airfoil comprising:
   forming an internal retention seat entirely inside two complementary airfoil parts;
   fabricating an insert configured for retention in said seat;
   assembling together said two parts, with said insert therebetween in said seat; and
   bonding together said two parts to trap said insert therein, and collectively define said airfoil.

2. A method according to claim 1 further comprising:
   forming a radial passage in said airfoil parts for channeling a cooling fluid therethrough;
   forming said seat to bridge said passage; and
   assembling said insert in said seat inside said passage.

3. A method according to claim 2 further comprising forming said seat to complement said insert and trap said insert radially.

4. A method according to claim 3 wherein:
   said passage is sized radially longer than said insert;
   said insert is sized radially longer than said seat; and
   said insert is unrestrained in said passage to thermally expand and contract from said seat.

5. A method according to claim 4 wherein said insert is configured as an impingement baffle having a hollow retention hub trapped in said seat for receiving said cooling fluid, and a perforate tube extending therefrom for distributing said fluid in impingement inside said airfoil parts.

6. A method according to claim 5 further comprising:
   forming a plurality of said seats radially spaced apart from each other;
   fabricating a plurality of said baffles; and
   assembling said baffles in corresponding ones of said seats in radial alignment.

7. A method according to claim 6 wherein said baffles are discrete members, and nested together for unrestrained differential thermal movement therebetween.

8. A method according to claim 6 wherein said baffles are integrally formed together in a unitary member defining a bellows for elastically accommodating differential thermal movement therebetween.

9. A method according to claim 4 wherein said insert is configured as a damper loosely trapped in said seat for permitting limited vibratory movement therebetween for frictional damping vibration of said airfoil.

10. A method according to claim 4 wherein said insert is configured as a tip cap trapped at a radially outer end of said airfoil, and having inclined holes formed therein for impingement cooling respective ones of said two airfoil parts at said outer end thereof.

11. A method according to claim 1 further comprising forming said seat to axially bridge said two airfoil parts.

12. A method according to claim 11 wherein said seat comprises axially extending flanges projecting internally toward each other from said two airfoil parts.

13. A method according to claim 12 wherein;
    said insert comprises an impingement baffle; and
    said seat further comprises a pair of said flanges spaced radially apart to define a slot circumferentially surrounding a hub of said baffle.

14. A method according to claim 12 wherein:
    said insert comprises a damper including a pair of disks joined together by a center shaft; and
    said seat further comprises a flat plate having a hole therethrough receiving said center shaft, with said disks being disposed on opposite sides of said plate.

15. A method according to claim 12 wherein:
    said insert comprises a tip cap having inclined holes formed through a side thereof; and
    said seat further comprises a pair of radially spaced apart ridges defining a groove therebetween circumferentially surrounding corresponding end flanges of said tip cap to hide said holes below the tip of said airfoil.

16. An impingement baffle for channeling cooling fluid between two airfoil parts bonded together and having an internal retention seat disposed entirely inside said two parts for retaining said baffle, said baffle comprising:
    a hollow retention hub configured for being trapped in said retention seat between said parts; and
    a perforate tube extending from said hub for distributing said fluid in impingement inside said airfoil parts.

17. A baffle according to claim 11 wherein:
    said two airfoil parts collectively define a hollow airfoil having a radial passage for channeling said cooling fluid, and include a retention seat for trapping said baffle hub; and said baffle hub is larger in diameter than said baffle tube to trap said hub in said seat, and space said tube from said airfoil parts for impingement cooling thereof.

18. A baffle according to claim 17 wherein:

said airfoil includes a plurality of said seats radially spaced apart from each other; and said baffle further comprises a plurality of said baffle hubs for being disposed in respective ones of said seats in radial alignment.

19. A baffle according to claim 18 wherein said baffle hubs are discrete members with corresponding integral tubes extending therefrom nested together for unrestrained differential thermal movement therebetween.

20. A baffle according to claim 18 wherein said baffle hubs and tubes are integrally joined together in a unitary member defining a bellows for elastically accommodating differential thermal movement therebetween.

21. A baffle according to claim 17 in combination with said airfoil, and wherein said retention seat comprises radially spaced apart flanges defining a slot circumferentially surrounding said baffle hub.

* * * * *